United States Patent
McClure et al.

[11] Patent Number: 5,598,690
[45] Date of Patent: Feb. 4, 1997

[54] TAILGATE LATCHING APPARATUS FOR A ROUND BALER

[75] Inventors: John R. McClure, New Holland; H. Nevin Lausch, Denver, both of Pa.

[73] Assignee: New Holland North America, Inc., New Holland, Pa.

[21] Appl. No.: 512,257

[22] Filed: Aug. 7, 1995

[51] Int. Cl.$^6$ ..................................................... A01D 39/00
[52] U.S. Cl. ............................................. 56/341; 100/88
[58] Field of Search ...................... 56/341, 475, DIG. 15; 53/118, 587, 389.3; 100/5, 13, 88, 99; 414/111, 473, 488, 505

[56] References Cited

U.S. PATENT DOCUMENTS

| | | | |
|---|---|---|---|
| 4,870,812 | 10/1989 | Jennings et al. | 56/341 |
| 5,226,359 | 7/1993 | Rempe | 56/341 X |
| 5,301,495 | 4/1994 | Van Zee | 56/341 |
| 5,477,668 | 12/1995 | Meyer | 56/475 X |

OTHER PUBLICATIONS

No. 3-1 of the 1992 New Holland Round Baler 630 Operator's Manual, No. 42063012 (Date 1992).

*Primary Examiner*—Terry Lee Melius
*Assistant Examiner*—Robert Pezzuto
*Attorney, Agent, or Firm*—Frank A. Seemar; Larry W. Miller; John William Stader

[57] ABSTRACT

Improved tailgate latching apparatus for a round baler having a main frame, a tailgate, stub shafts for pivotally coupling the tailgate to the main frame, and a bale forming chamber mounted on the frame and the tailgate for forming crop material into a cylindrical package of crop material, which chamber has a generally transverse opening for permitting the ingress of crop material. The baler also includes a pickup for picking up crop material from the field and feeding it rearwardly along a path in the direction of the transverse opening, a drive for pivoting the tailgate from a closed position to an open position for discharging the bale onto the surface of the field, and a latching assembly for holding the tailgate in its closed position, which assembly comprises a latch arm mounted on the main frame, a latch pin mounted on the tailgate in operative relationship with the latch arm. The drive is coupled to the latch arm for moving the latch arm between latched and unlatched positions corresponding to open and closed positions of the tailgate. A stop is mounted on the main frame for engaging the latch arm to prevent the latch arm from exerting downward force on the tailgate via the latch pin to avoid any resulting transmittal of the downward force to the stub shaft.

8 Claims, 6 Drawing Sheets

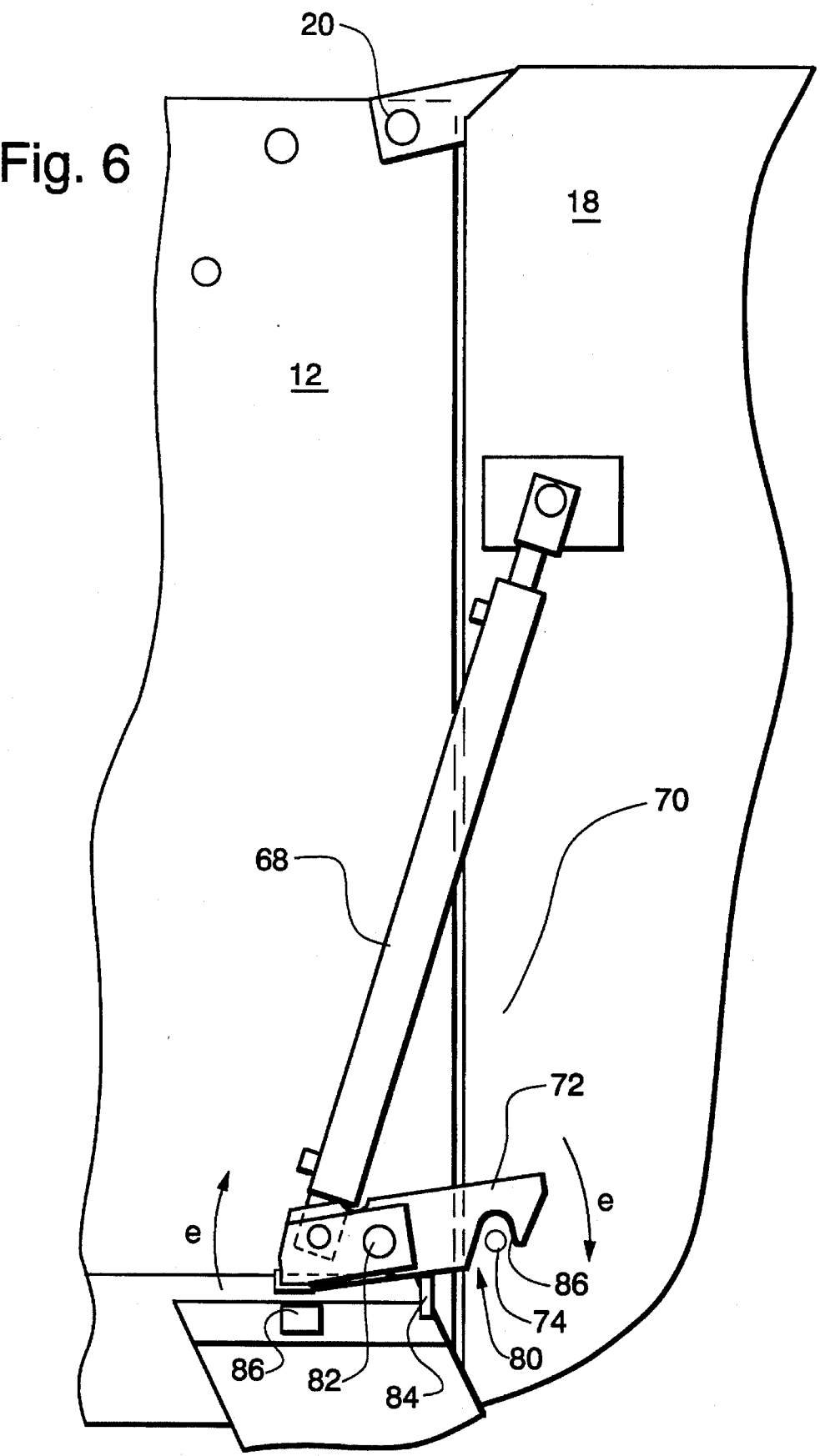

TAILGATE LATCHING APPARATUS FOR A ROUND BALER

FIELD OF THE INVENTION

This invention, relating generally to a baler for forming cylindrical bales of crop material, commonly referred to as a round baler, is directed to improved tailgate latching apparatus. More particularly, this invention is concerned with an improvement to the latching apparatus that secures the tailgate of a round baler to the main frame during bale formation.

BACKGROUND OF THE INVENTION

Prior art round balers generally have a bale forming chamber defined by an apron comprising an array of side-by-side belts, transverse slats extending between chains, a plurality of bale forming rolls or a combination of these various elements, e.g., bale forming rolls and side-by-side belts. The utilization of rolls in combination with belts is shown by way of example in the round baler of U.S. Pat. No. 4,870,812, issued Oct. 3, 1989 in the name of Richard E. Jennings, et al. In most balers the chamber defining elements, such as rolls and belts, are operatively mounted between the walls of a main frame as well as within the confines of a tail gate pivotally mounted to the main frame by coaxial pivot pins. In some balers the diameter of the chamber is fixed while in others the chamber expands as the size of the cylindrical package of crop material increases.

During field operation, a pickup assembly picks up crop material, such as hay, from the ground and feeds it into a fixed or expandable bale forming chamber where it is rolled up to form a compact cylindrical package of hay. While still inside the chamber the formed package is wrapped in its compact form by net, twine, or the like, after which the tailgate is pivoted open by hydraulic means, or the like, and the package is discharged as a completed bale onto the ground for subsequent handling. The tailgate is then closed whereupon the chamber is again ready for the formation of a similar subsequent package of crop material into a round bale.

It is common practice to use a latching assembly to maintain a round baler tailgate in the closed position during bale formation in the chamber. A good example of an arrangement of this type is shown on the front cover of New Holland Operator's Manual for Round Baler Model 630, No. 42063012, issued in 1992. The baler shown on page 3-1 of this manual also shows a latching assembly under conditions where the tailgate is open. Under certain crop conditions, prior art systems of this nature have caused excessive stress on the tailgate pivot pins when the hydraulic cylinder, employed to hold the latch in place during operation, exerts a force on the latch pin, which is applied as a rotational force on the tailgate pivot pins. Concurrently, a lateral force is incumbent on the tailgate during bale formation as the package of crop material expands within the chamber. Thus, the latch pin, which is being forced downwardly, transmits a downward force to the entire tailgate, which in turn produces the deleterious rotational force mentioned above, while at the same time a lateral force is being applied to the pivot pins, all of which could cause stress and ultimate fatigue if left uncorrected.

SUMMARY OF THE INVENTION

An important object of the present invention is to provide improved tailgate latching apparatus for round balers that overcomes the above mentioned problem.

In pursuance of this and other important objects the present invention provides an improved baler for traversing a field to form round bales of crop material. The baler has a main frame, a tailgate, means for pivotally coupling the tailgate to the main frame, means for supporting the frame above the surface of the field, and a bale forming chamber defined by means mounted on the frame and the tailgate for forming crop material into a cylindrical package of crop material, which chamber has a generally transverse opening for permitting the ingress of crop material. The baler also includes means for wrapping the cylindrical package of crop material to form a round bale in the bale forming chamber, a pickup for picking up crop material from the field and feeding it rearwardly along a path in the direction of the transverse opening, lift means for pivoting the tailgate from a closed position to an open position for discharging the bale onto the surface of the field, and a latching assembly for holding the tailgate in the closed position, which assembly comprises a latch arm mounted on the main frame, a latch pin mounted on the tailgate in operative relationship with the latch arm, and means for coupling the lift means to the latch arm for moving the latch arm between latched and unlatched positions corresponding to the open and closed positions of the tailgate. According to the broadest aspects of the present invention, unique means are mounted on the main frame for engaging the latch arm to prevent the latch arm from exerting downward force on the tailgate via the latch pin to avoid any resulting transmittal of such downward force to the shaft means.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE DRAWINGS

FIGS. 4–6 are views showing the latching mechanism of the present invention in further detail during selected conditions during operation of the round baler.

DESCRIPTION OF THE PREFERRED EMBODIMENT

Figure 1:
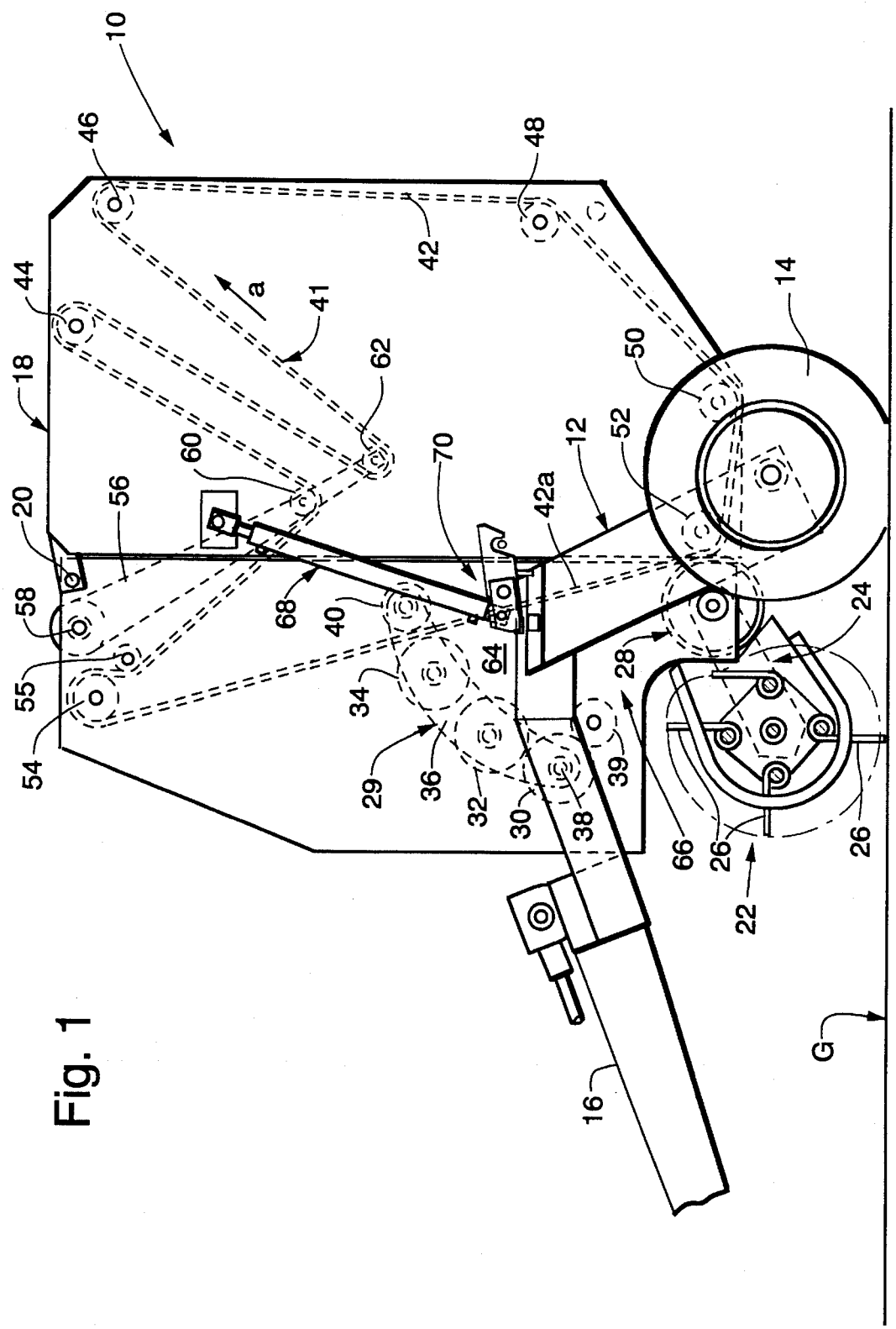
FIG. 1 is a side elevational view of a round baler in which the present invention is embodied.
Figure 2:
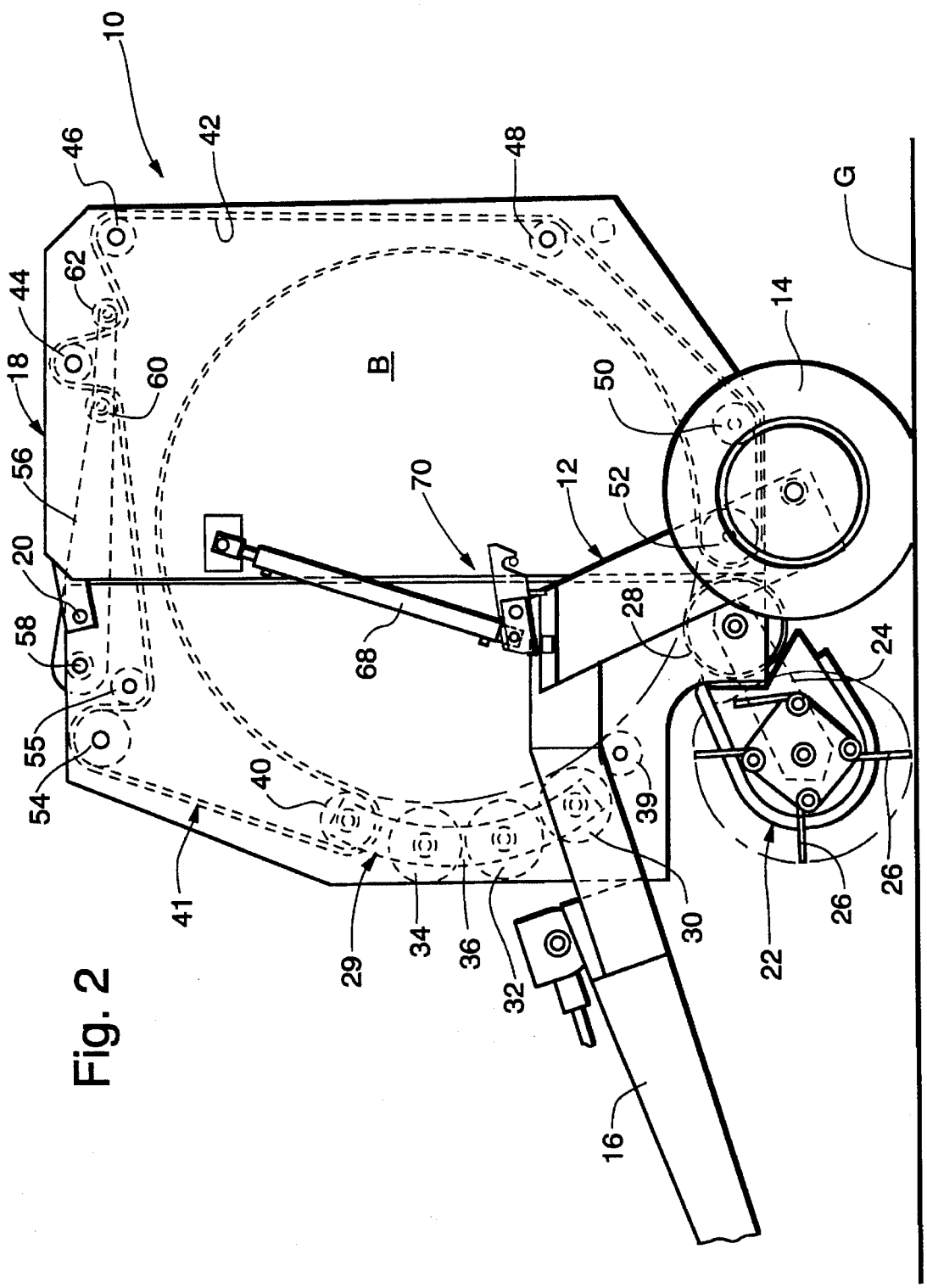
FIG. 2 is another side elevational view of the round baler of FIG. 1 in which the cylindrical package of crop material has reached the maximum diameter.
Figure 3:
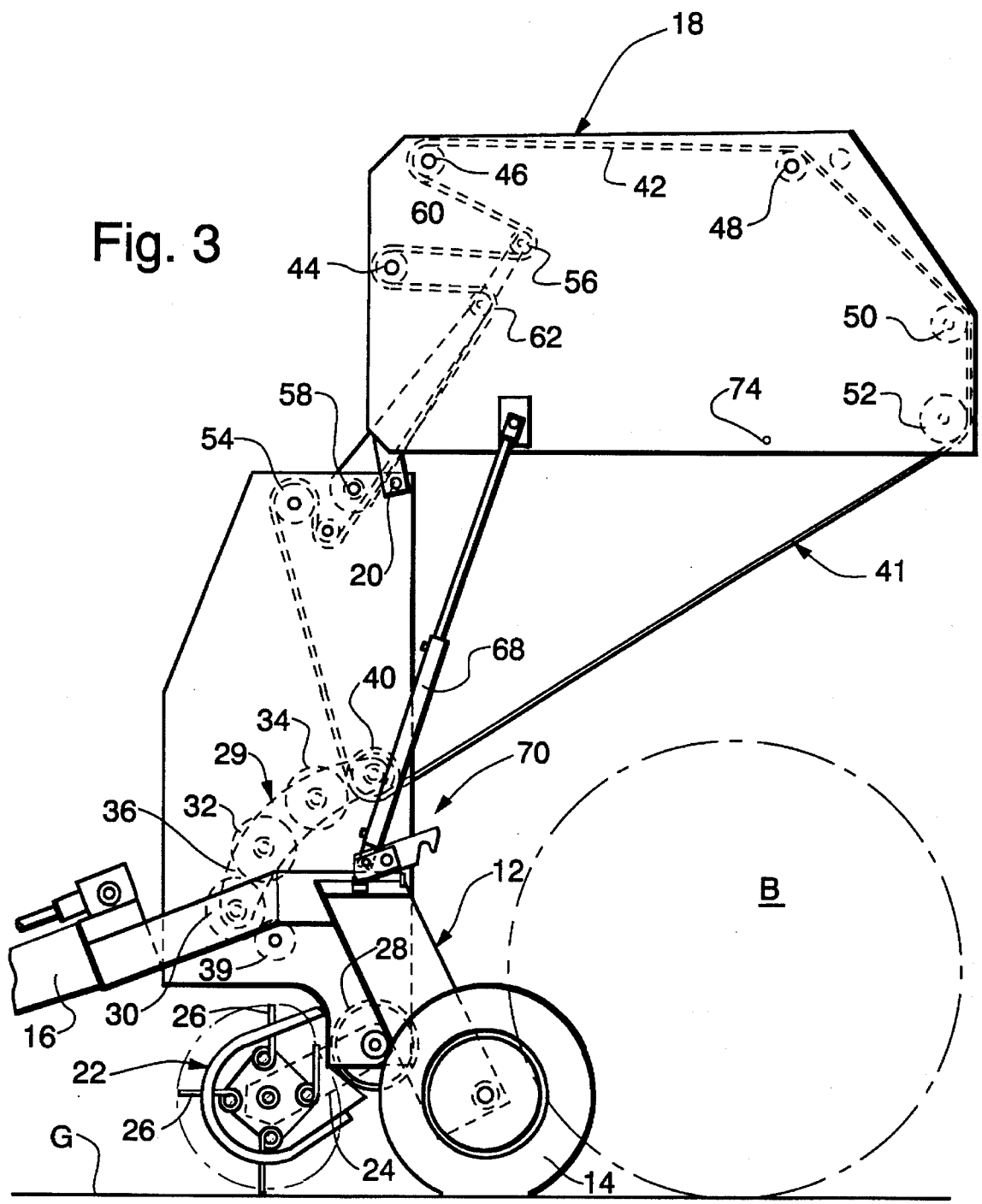
FIG. 3 is a further side elevational view of the round baler of FIG. 1 in which the tailgate is in the fully open position during bale ejection.

Referring now to the drawings for a more detailed description of the preferred embodiment of the invention, FIGS. 1 through 3 show an expandable chamber round baler 10 of the type disclosed in U.S. Pat. No. 4,870,812 issued on Oct. 3, 1989 in the name of Richard E. Jennings, et al. Baler 10 includes a main frame 12 supported by a pair of wheels 14 (only one shown), a tongue 16 on the forward portion of main frame 12 for connection to a tractor, and a tailgate 18 pivotally connected to main frame 12 by stub shafts 20 so that tailgate 18 may be closed as shown in FIGS. 1 and 2 during bale formation and wrapping or opened to discharge a completed bale B as shown in FIG. 3. A conventional pickup 22 is mounted on the main frame 12 by a pair of brackets 24 and is supported by a pair of wheels (not shown). The pickup includes a plurality of tines 26 moveable in a predetermined path to lift crop material from the ground and deliver it rearwardly toward a floor roll 28 which is rotatably mounted on main frame 12.

Baler 10 includes a sledge assembly 29 having a plurality of rollers 30, 32, 34 extending transversely of main frame 12 in an arcuate array common to the type baler described in U.S. Pat. No. 4,870,812, mentioned above. Rollers 30, 32, 34 are journalled at the ends thereof in a pair of spaced apart arms 36 (only one shown) pivotally mounted inside main frame 12 on stub shafts 38 for permitting pivotal movement of sledge assembly 29 between a bale starting position shown in FIG. 1 and a full bale position shown in FIG. 2. Rollers 30, 32, 34 are driven in a clockwise direction (as viewed in FIG. 1) by conventional means connected to a PTO (power take off) of a tractor (not shown). A starter roll 39 is located adjacent roller 30 and is also driven in a clockwise direction to strip crop material from roller 30. A freely rotatable idler roller 40 is also mounted on arms 36 for movement with sledge assembly 29.

An apron, generally referred to by reference numeral 41, includes a plurality of continuous flat side by side belts 42 supported by guide rolls 44, 46, 48, 50, 52, rotatably mounted in tailgate 18. Apron 41 is also supported on a drive roll 54 rotatably mounted on main frame 12. Although belts 42 pass between roller 34 and idler roller 40, it is only in engagement with idler roller 40. Roller 34 is located in close proximity to apron 41 to strip crop material from its belts, as referred to above. Conventional means (not shown) provide rotation of drive roll 54 causing movement of apron 41 in direction a along the path indicated in broken lines in FIG. 1. An additional guide roll 55 in main frame 12 ensures proper driving engagement between apron 41 and drive roll 54. A pair of take up arms 56 (one shown) are pivotally mounted on main frame 12 by a cross shaft 58 for movement between varying inner and fixed outer positions, corresponding to bale forming and full bale conditions, shown in FIGS. 1 and 2, respectively. Take up arms 56 carry additional guide rolls 60, 62 for supporting apron 41. Resilient means (not shown) are provided to normally urge take up arms 56 toward their inner positions while resisting movement thereof from their inner positions to their outer positions to keep tension on the bale forming belts in a known manner.

When baler 10 is in the condition shown in FIG. 1 with tailgate 18 closed, an inner course 42a of apron belts 42 extending between guide roll 52 and idler roll 40 cooperates with rollers 30, 32, 34 of sledge assembly 29 to define a bale stating chamber 64. Apron inner course 42a forms a rear wall of chamber 64 while rolls 30, 32, 34 form a front wall. Floor roll 28 is disposed in the bottom of chamber 64 between the front and rear walls. Roller 30 is spaced from floor roll 28 to provide an inlet 66 for chamber 64. In this bale starting position of the chamber arms 56 are urged into their innermost position shown in FIG. 1.

As baler 10 is towed across a field by a tractor, pick up tines 26 lift crop material, usually in a windrow, from the ground and deliver it rearwardly into the bale forming chamber through transverse inlet 66, commonly referred to as the throat. The crop material fed through throat 66 is continuously coiled in a counter clockwise direction in chamber 64 until the inner courses of apron 42 expand to the position shown in FIG. 2. This formation of a cylindrical package takes place in a well known manner, after which the package is wrapped, tailgate 18 is opened by conventional means, such as a pair of hydraulic cylinders 68 (only one shown), and bale B is discharged rearwardly as shown in FIG. 3. Subsequent closing of tailgate 18 returns apron inner course 42a to the location shown in FIG. 1 by virtue of arms 56 being returned to their innermost position, as shown in FIG. 1, whereupon the baler is ready to form another bale.

Thus, during formation of bale B, sledge assembly 29 moves from its bale starting position to its full bale position under conditions where crop material is being fed into the chamber along a spiral path which expands the chamber. As this is taking place, sledge assembly 29 is being pushed outwardly until it reached the full bale position. During bale ejection, sledge assembly 29 is being returned inwardly toward its bale starting position until it reaches same without the utilization of any additional mechanisms.

Figure 4:
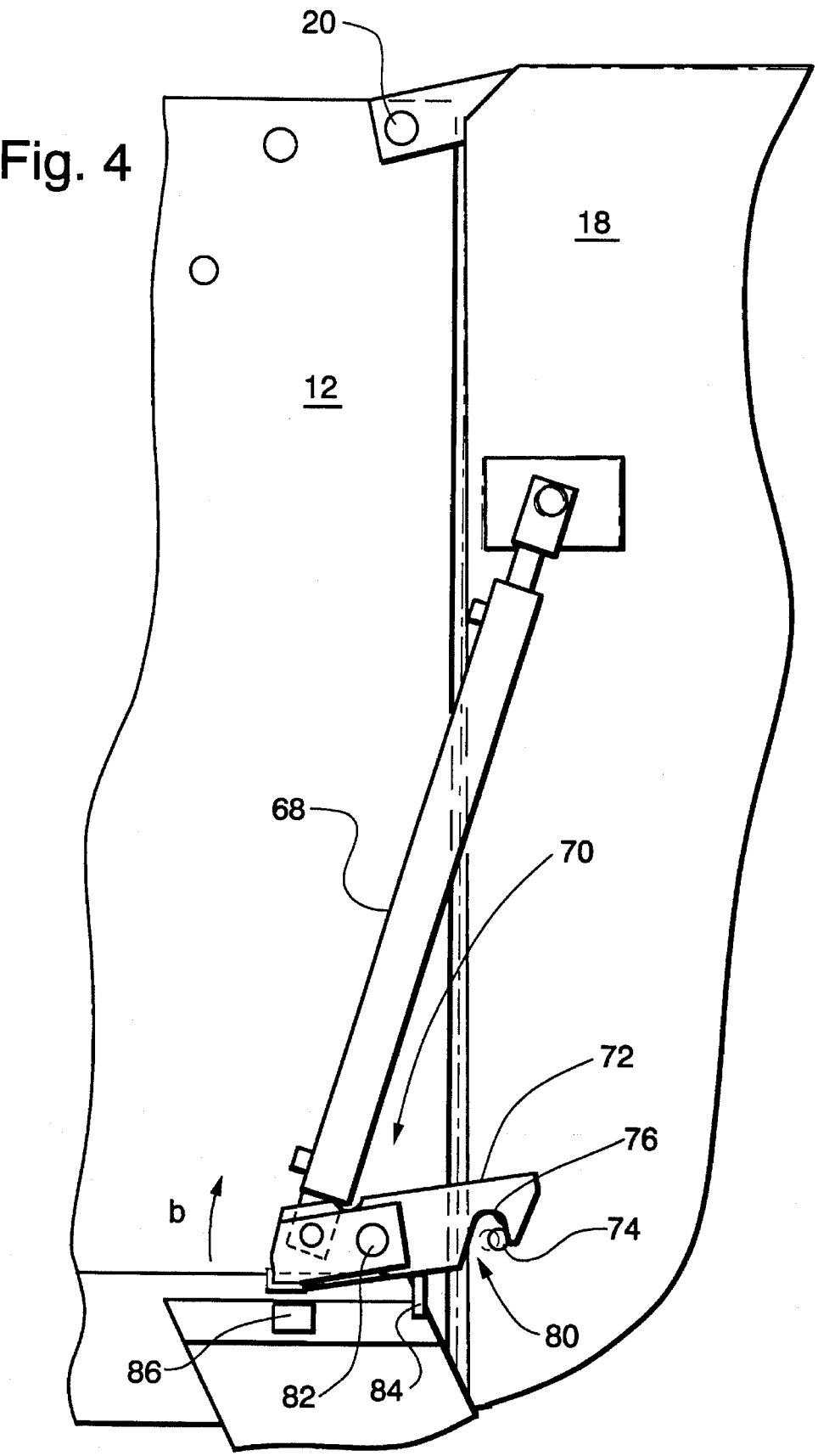
Figure 5:
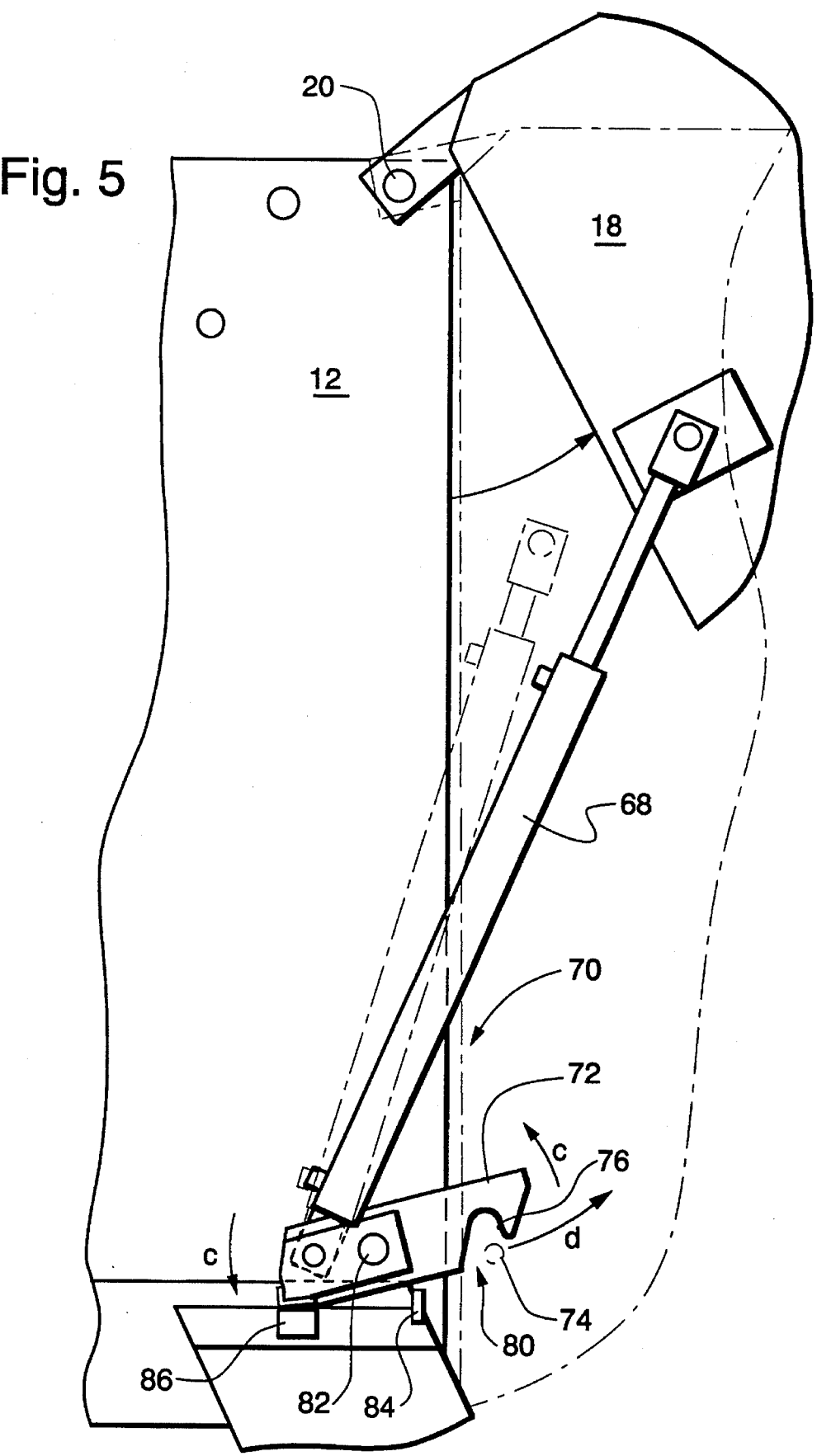

Now turning to FIGS. 4–6 where the latching apparatus of the present invention is shown in further detail in its preferred embodiment as adapted to the structure of the above described round baler. It should be noted that it is not intended that its use be limited to balers of this nature, but that the present invention is adaptable for use on most if not all currently known fixed and expandable chamber round balers in which a tailgate is pivotally mounted on the main frame.

In FIG. 4 latching apparatus, generally designated by reference numeral 70 throughout the drawings, comprising a latch arm 72 and a latch pin 74, is shown in the position corresponding to the core forming position of baler 10 shown in FIG. 1, i.e., the closed chamber condition in which no crop material has been fed into the chamber. In FIG. 4 the position of tailgate 18 in the core forming position of baler 10 is represented by the phantom outline and its position during bale formation is shown in solid lines. As a bale is being formed the chamber expands causing tailgate 18 to pivot about pin 20, moving latch pin 74 against the side edge 76 of notch 80 in latch arm 72. Hydraulic fluid in cylinder 68 provides a force that pivotally pulls latch arm 72 about a mounting pin 82 in direction b. The travel of latch arm in direction b is limited by a stop 84, which prevents pin 74 from engaging the arcuate portion of notch 80. Thus, as a bale is being formed in the bale chamber of baler 10 cylinder 68 holds latch arm 72 in place which in turn holds the tailgate closed. Accordingly, as force is applied to tailgate 18 by the expanding package of crop material in the chamber, pin 74 is forced against edge 76 of notch 80 and latch 72 is urged against stop 84, the result of which prevents any downward force on pin 74.

When a cylindrical package of crop material in the chamber reaches full size as shown in FIG. 2, cylinder 68 is utilized in known manner to open tailgate 18 to the position shown in solid lines in FIG. 5. This position corresponds to the full bale position of baler 10 shown in FIG. 3. When a bale is ready to be discharged from the chamber, cylinder 68 is activated to pivot latch arm 72 in direction c (FIG. 5) until it engages shoulder 86, which lifts notch 80 upwardly and free of pin 74, whereupon pin 74 becomes free to travel along path d as tailgate 18 is being lifted to its open position by continued activation of cylinder 68.

After bale B is discharged onto ground surface G, as illustrated by FIG. 3, tailgate 18 is returned to its closed position, shown in FIG. 6, and baler 10 is again in its core forming position. Prior to commencing with the formation of a bale latch 70 is returned to its latch position by rotating latch arm 72 in direction e, whereupon it engages stop 84 and is separated from shoulder 86 putting baler 10 in condition for initiating the formation of another bale in the manner described above.

At the heart of the present invention is stop 84 which prevents the transmittal of downward force via pin 74 under conditions where a bale is being formed in the bale forming chamber. The arcuate portion of notch 80 does not come in contact with pin 74. This prevents transmission of a vertical force and thereby obviates a rotational force on the tailgate which would stress pin 20 at the same time lateral forces are being applied to pin 20 by the bale via the tailgate during expansion.

In summary, the many advantages, explicit and implicit, of the latching apparatus described herein is the provision of a baler with overall enhanced operation due to reduced potential down time for untimely and costly field repair in the event the tailgate pivot pin fails due to excessive fatigue.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. In a baler for traversing a field to form round bales of crop material, said baler comprising a main frame, a tailgate, shaft means for pivotally coupling said tailgate to said main frame, means for supporting said frame above the surface of said field, a pickup mounted forwardly on said main frame for picking up crop material from said field and feeding said crop material rearwardly as said baler traverses said field, a bale forming chamber defined by means mounted on said frame and said tailgate for forming crop material into a cylindrical package of crop material, said chamber having a generally transverse opening for receiving crop material being fed rearwardly by said pickup, means for wrapping said cylindrical package of crop material to form a round bale in said bale forming chamber, lift means for pivoting said tailgate from a closed position to an open position for discharging said bale onto the surface of said field, and a latching assembly for holding said tailgate in said closed position comprising a latch arm mounted on said main frame, a latch pin mounted on said tailgate in operative relationship with said latch arm, and means for coupling said lift means to said latch arm for moving said latch arm between latched and unlatched positions corresponding to said open and closed positions of said tailgate, the improvement comprising; stop stop means mounted on said main frame for engaging said latch arm to prevent said latch arm from exerting downward force on said tailgate via said latch pin, while maintaining said tailgate in said closed position, to avoid any resulting transmittal of said downward force to said shaft means.

2. In a baler as set forth in claim 1 wherein said latching assembly further comprise pivot means for mounting said latch on said main frame, and said means mounted on said main frame comprise a stop disposed in the path of said latch arm.

3. In a baler as set forth in claim 2 wherein said latch arm includes a notch for receiving said latch pin under conditions where said tailgate is in said closed position and said latch arm is in said latched position.

4. In a baler as set forth in claim 3 wherein said notch is generally U-shaped and disposed with front and rear downwardly extending edges, whereby said pin is urged against one of said edges of said notch in a horizontal direction during formation of a bale in said chamber.

5. In a baler as set forth in claim 4 wherein said lift means include an hydraulic cylinder operatively affixed between said main frame and said tailgate.

6. In a baler as set forth in claim 4 wherein said stop is in contact with said latch arm under conditions where said pin is received by said notch.

7. In a baler as set forth in claim 5 wherein said latch arm and said stop are not in contact with each other under conditions where said latch arm is pivoted from its latch position to its unlatched position.

8. In a baler as set forth in claim 3 wherein said stop comprises an element having an edge extending transverse to the path of said latch arm.

* * * * *